United States Patent
Stine et al.

(10) Patent No.: US 7,639,710 B1
(45) Date of Patent: Dec. 29, 2009

(54) MODULAR IMPLEMENTATION OF A PROTOCOL IN A NETWORK DEVICE

(75) Inventors: Arthur Stine, Fremont, CA (US); Paul S. Traina, Atherton, CA (US); Spencer Greene, Palo Alto, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 1205 days.

(21) Appl. No.: 10/374,712

(22) Filed: Feb. 27, 2003

(51) Int. Cl.
  *H04L 12/66* (2006.01)
(52) U.S. Cl. .............. 370/463; 370/466; 370/401
(58) Field of Classification Search ........... 370/463, 370/328, 338, 466, 401
See application file for complete search history.

(56) References Cited

U.S. PATENT DOCUMENTS

| | | | | |
|---|---|---|---|---|
| 5,349,579 A * | 9/1994 | Madonna et al. | ............ | 370/259 |
| 5,416,776 A * | 5/1995 | Panzarella et al. | .......... | 370/463 |
| 6,381,239 B1 * | 4/2002 | Atkinson et al. | ............ | 370/362 |
| 6,457,056 B1 * | 9/2002 | Choi | ......................... | 709/230 |
| 6,816,936 B1 * | 11/2004 | Wu et al. | .................... | 710/302 |
| 6,934,530 B2 * | 8/2005 | Engelhart | ................... | 455/406 |
| 6,947,410 B1 * | 9/2005 | Schwartz et al. | ............ | 370/352 |
| 7,146,436 B1 * | 12/2006 | Manchester | ................. | 710/10 |
| 7,206,856 B1 * | 4/2007 | Murphy et al. | ............. | 709/238 |
| 2002/0078383 A1 * | 6/2002 | Leerssen et al. | ............ | 713/201 |
| 2002/0080775 A1 * | 6/2002 | Engbersen et al. | ......... | 370/352 |
| 2002/0095498 A1 * | 7/2002 | Chanda et al. | ............. | 709/225 |
| 2003/0002541 A1 * | 1/2003 | Fowler et al. | ............... | 370/535 |
| 2003/0009548 A1 * | 1/2003 | Poynor | ....................... | 709/223 |
| 2003/0041187 A1 * | 2/2003 | Watanabe | .................... | 710/10 |
| 2003/0123457 A1 * | 7/2003 | Koppol | ....................... | 370/400 |
| 2004/0105425 A1 * | 6/2004 | Chen et al. | .................. | 370/352 |
| 2004/0117431 A1 * | 6/2004 | Le et al. | ..................... | 709/200 |
| 2004/0148448 A1 * | 7/2004 | Wachel | ....................... | 710/300 |
| 2005/0213989 A1 * | 9/2005 | English et al. | .............. | 398/164 |

* cited by examiner

*Primary Examiner*—Kwang B Yao
*Assistant Examiner*—Nguyen Ngo
(74) *Attorney, Agent, or Firm*—Harrity & Harrity, LLP

(57) ABSTRACT

A system includes a gateway node that contains modular cards that separately implement control and data planes of a network protocol. The separate data and control cards provide for improved system reliability and improved flexibility in managing bandwidth. Control or data cards can be added to the gateway node as needed based on system load.

23 Claims, 4 Drawing Sheets

MODULAR IMPLEMENTATION OF A PROTOCOL IN A NETWORK DEVICE

BACKGROUND OF THE INVENTION

A. Field of the Invention

The present invention relates generally to communication networks, and more particularly, to implementing routing protocols in a wireless network.

B. Description of Related Art

Global System for Mobile Communications (GSM) is a leading digital wireless communications standard. A basic GSM network is designed for voice traffic. GPRS (General Packet Radio Service) is an enhancement to GSM that allows GSM operators to provide packet data services to their wireless subscribers.

Before GPRS, the radio capacity in a wireless network was conventionally used for calls and data transmission within the GSM network in a rather inefficient manner. For data transmission, the entire channel was occupied and was often insufficiently used. Through GPRS, more than one user may share the same channel, allowing for a more efficient allocation of channel resources. Additionally, a GPRS mobile phone may use several channels for data transfer, thus facilitating greater transfer speeds. Through GPRS, a mobile phone user could simultaneously make a call and receive an email message.

A GPRS network uses a number of protocols, one of which is the GPRS tunnel protocol (GTP). GTP is a protocol designed to tunnel user data and signaling information between nodes in a GPRS network. The GTP protocol includes a call-setup (signaling/control plane) component and a bearer traffic (data plane) component. Conventionally, the control plane component and the data plane component of the GTP protocol are handled by nodes in the GPRS network using a single integrated unit to handle processing for both the call setup and bearer traffic components of the protocol. This technique may lack flexibility and scalability.

Thus, it would be desirable to handle traffic in a GPRS network in a manner that is both flexible and modular from the standpoint of the GPRS network nodes.

SUMMARY OF THE INVENTION

Systems and methods consistent with principles of the invention include a router that supports removable cards, including separate cards for handling call setup/control functions and packet forwarding functions under protocols such as GTP.

One aspect of the invention is directed to a device for implementing a network protocol. The device includes a first type of interface card and a second type of interface card. The first type of interface card is configured to perform functions related to establishing communication sessions under the network protocol. The second type of interface card performs functions related to data transfer in a communication session established by the first type of interface card.

Another aspect of the invention is directed to a method. The method includes receiving a request that a call be completed in a network, the request being processed by a master control card in a gateway node. The method further includes transferring the request to a slave control card in the gateway node and initiating, by the slave control card, a communication session with a destination device. The method still further includes transferring the communication session to a data card in the gateway node when the communication session is initiated and forwarding data of the communication session via the data card.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

A router at a gateway GPRS support node (GGSN) includes a number of removable cards. The cards may include, in addition to media cards that physically connect to an external network, separate cards for handling call setup/control functions and packet forwarding functions under GTP. The cards are interchangeable and can be added and removed as needed.

Exemplary Network

Figure 1:
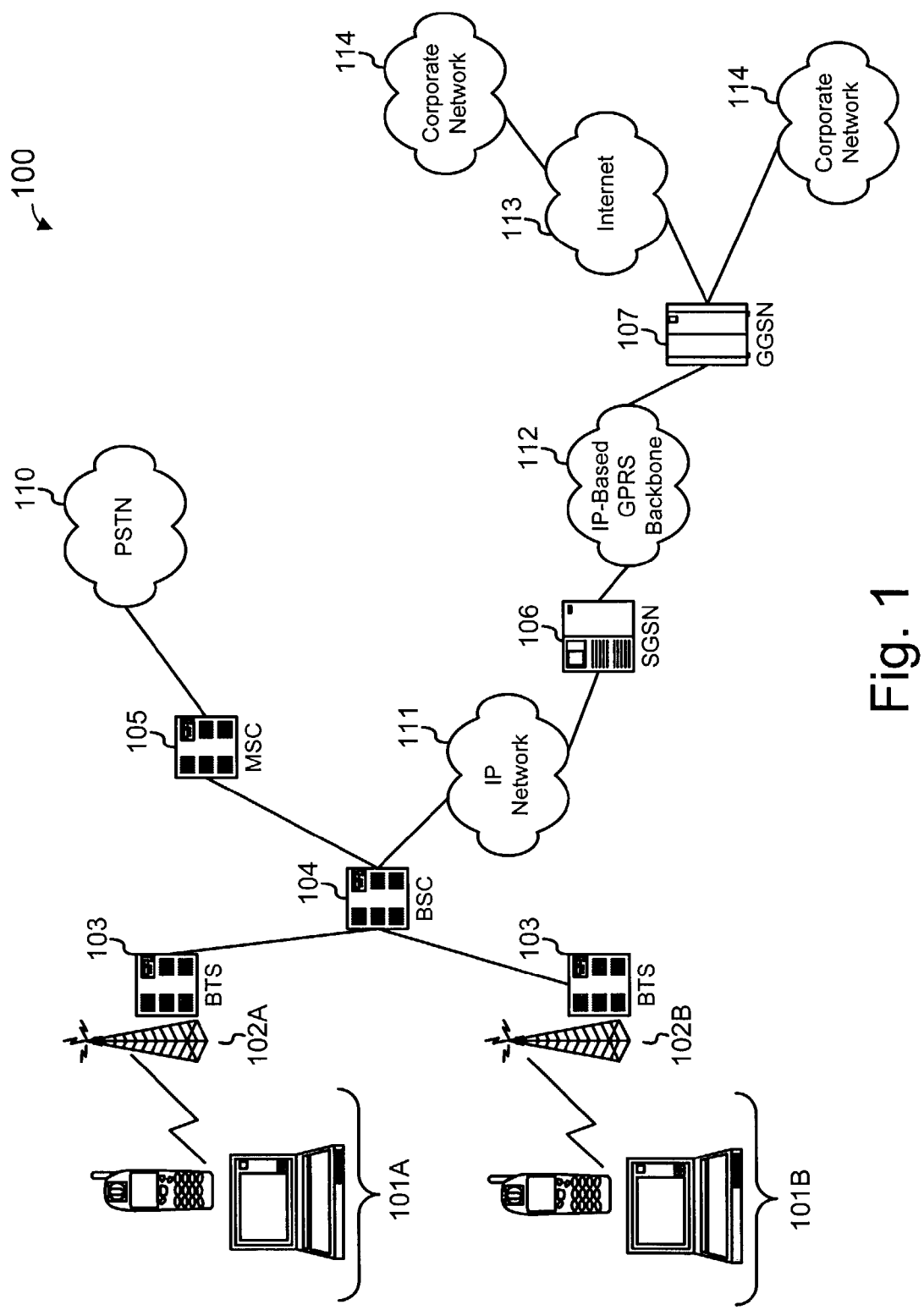
FIG. 1 is a diagram illustrating an exemplary network consistent with principles of the invention.

FIG. 1 is a diagram illustrating an exemplary network 100 consistent with principles of the invention. Network 100 includes end-users 101A and 101B that communicate wirelessly with base stations 102A and 102B (collectively referred to as end-users 101 and base stations 102, respectively). End-users 101 may include any device that communicates wirelessly, such as, for example, wireless phones, personal digital assistants, or notebook computers. With any of these devices, users may communicate using wireless voice and/or data services.

Information received at base stations 102 may be forwarded through a number of network elements, including base transceiver stations (BTSs) 103 and base station controller (BSC) 104. BTSs 103 may be transceivers that receive and broadcast information via base stations 102. BSC 104 may be a packet-based device that connects BTSs 103 to a mobile switching center (MSC) 105, which may further connect to a network such as a public switched telephone network (PSTN) 110. In this manner, through MSC 105, end-users 101 can communicate with users on the PSTN 110.

BSC 104 may additionally connect to a serving GPRS support (SGSN) node 106 via an IP network 111. SGSN 106 can be thought of as a packet-switched mobile switching center. SGSN 106 delivers packets to end-users 101 within its service area. SGSN 106 may obtain profile data of GPRS end-users, detect new end-users in a given service area, process registration of new end-users, and keep a record of the location of an end-user user with a service area. Thus, in general, SGSN 106 performs mobility management functions for the mobile end-users within its service area.

GGSN 107 acts as an interface from SGSNs to external IP networks such as the public Internet 113, other mobile service provider's GPRS services, or private enterprise or corporate networks 114. GGSN 107 may maintain routing information that is necessary to tunnel protocol data units to SGSN 106, under, for example, GTP.

Additional details of the implementation of BTSs 103, BSC 104, MSC 105, and SGSN 106 will not be described further herein, as these elements are generally well known in the art.

GGSN 107

Figure 2:
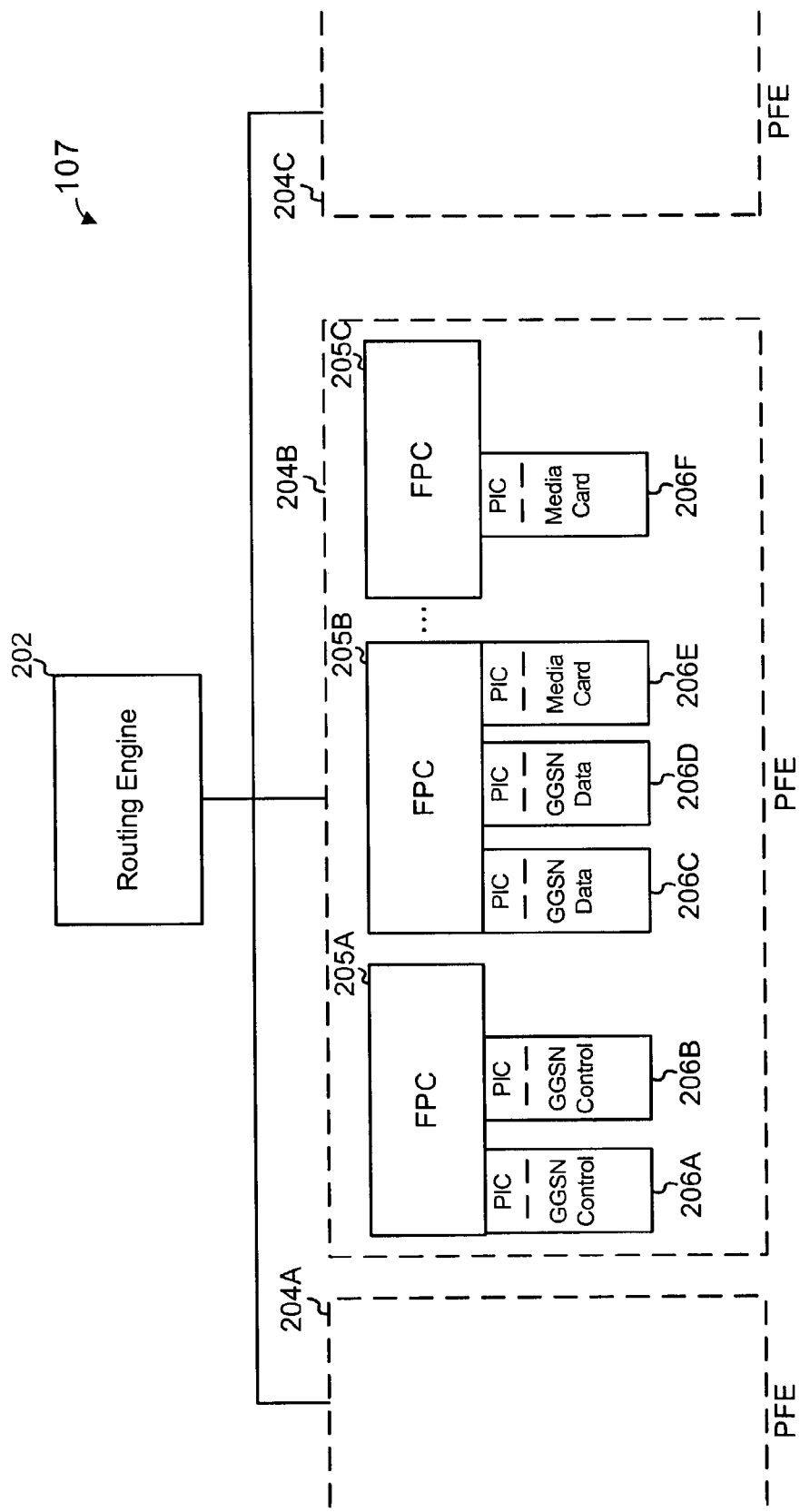
FIG. 2 is a diagram illustrating the GGSN shown in FIG. 1 in additional detail.

FIG. 2 is a diagram illustrating GGSN 107 in additional detail consistent with principles of the invention. GGSN 107 may be generally structured in a manner similar to a router. GGSN 107 may include one or more packet forwarding engines (PFEs) 204A, 204B . . . 204C (collectively referred to as PFEs 204) and a routing engine 202. In general, GGSN 107 receives one or more data streams from a physical link, processes the data streams to determine destination information, and transmits the data streams out on links in accordance with the destination information.

Routing engine 202 performs high-level management functions for GGSN 107. For example, routing engine 202 communicates with external networks and systems, such as networks 113 and 114, connected to GGSN 107 to exchange information regarding network topology. Routing engine 202 may create routing tables based on network topology information and create forwarding tables based on the routing tables and forwards the forwarding tables to PFEs 204. PFEs 204 may use the forwarding tables to perform route lookup for incoming packets (or other structured data units). Routing engine 202 also performs other general control and monitoring functions for GGSN 107.

One of PFEs 204, PFE 204B, is shown in FIG. 2 in detail. As shown, PFE 204B may contain flexible port concentrators (FPCs) 205A, 205B . . . 205C that have slots that hold one or more physical interface cards (PICs) 206A-206F in physical slots. PICs 206 may be modular and replaceable elements within FPCs 205. In one implementation, PICs 206 may also be hot-swappable, meaning that they may be inserted and removed while GGSN 107 is operating. Any one of PICs 206A-206F may be inserted in a slot of any of FPCs 205A-205C.

PICs 206 may perform a number of different functions. PICs 206E and 206F, for example, may be transport media cards that physically receive and transmit data on a network (connection not shown), such as network 112, 113, or 114 (FIG. 1). Each PIC 206E and 206F may be designed to communicate with one of many types of transport media, such as optical fiber or Ethernet cable. The transmitted and received data may be formatted according to one of several protocols, such as the synchronous optical network (SONET) standard, an asynchronous transfer mode (ATM) technology, or Ethernet. Different PICs 206E and 206F are designed to handle different types of transport media. For example, PIC 206E may be an interface for an optical link while PIC 206F may be an interface for an Ethernet link.

PICs 206A-206D may not be media cards. Instead, consistent with principles of the invention, these PICs may be interface cards designed to handle the processing for a transmission protocol, such as GTP. In this manner, PICs 206A-206D may augment the traditional routing functions of routing engine 202 and PFEs 204A-204C by allowing these elements to function as a GGSN.

PICs 206A-206D may include separate PICs for handling control functions and data delivery in GTP. These PICs are illustrated in FIG. 2 as GGSN control PICs 206A and 206B and GGSN data PICs 206C and 206D. In general, control PICs 206A and 206B handle call setup. Data PICs 206C and 206D handle packet forwarding once a call session has been setup by one of control PICs 206A and 206B.

Figure 3:
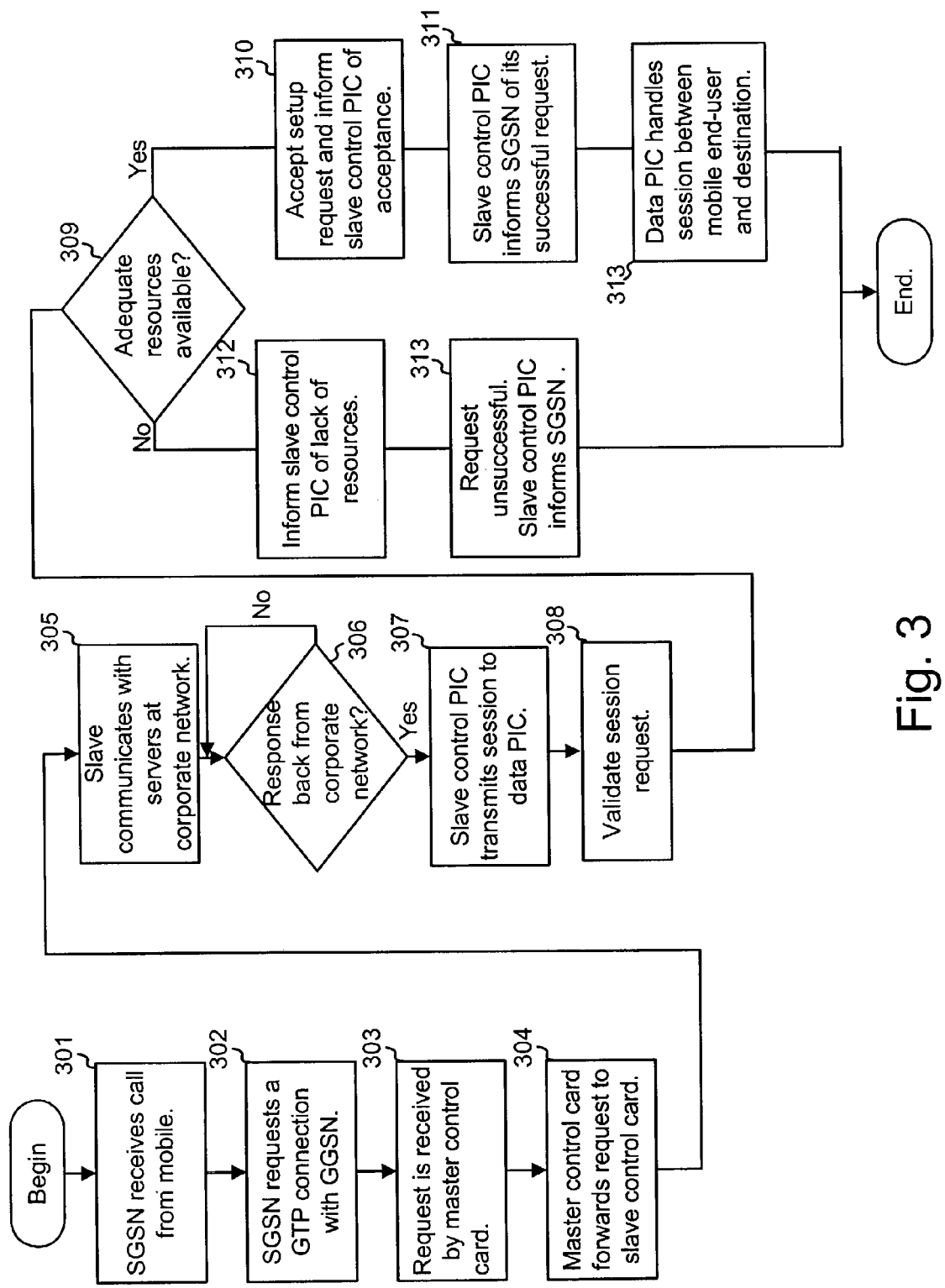
FIG. 3 is a flow chart illustrating call setup and data transfer consistent with principles of the invention.

FIG. 3 is a flow chart illustrating call setup and data transfer in GGSN 107 consistent with principles of the invention. In the example shown in FIG. 3, an end-user 101 initiates a call from a mobile phone requesting data, such as a corporate (enterprise) network, such as one of corporate networks 114. A salesman away from the office may, for example, remotely check a company email account via a cell phone. The call is initially transferred through BTS 103, BSC 104, and IP network 111 to SGSN 106.

SGSN 106, upon receiving the call, requests a GTP connection with GGSN 107 (Acts 301 and 302). At GGSN 107, the request is received at one of media PICs 206E and 206F, and transferred to one of control PICs 206A and 206B by one of PFEs 204 (Act 303). In one implementation, one of the control PICs 206A and 206B, such as control PIC 206A, is designated as a "master" control PIC. The master control PIC 206A receives all initial connection requests form SGSN 106.

Master control PIC 206A may then forward the received request to one of the other "slave" control PICs, such as control PIC 206B (Act 304). The slave control PIC 206B may then communicate with designated servers in corporate network 114 to establish that a mobile user/device is attempting to initiate a connection (Act 305). One of ordinary skill in the art will recognize that the slave control PIC may communicate with networks other than a corporate network. The use of a master control PIC and slave control PICs allows the master control PIC to efficiently balance incoming requests among the available slave control PICs. Corporate network 114 may include RADIUS (remote authentication dial-in user service) and DHCP (dynamic host configuration protocol) servers. RADIUS and DHCP servers are well known in the art. In general, a RADIUS server implements a client/server protocol through which the mobile end-user is authenticated to corporate network 114. The DHCP protocol dynamically assigns IP addresses to connecting mobile devices. Address assignment mechanisms other than DHCP may also be used.

When slave control PIC 206B finishes authentication and address assignment with the corporate network 114, it transfers the session setup information to one of data PICs 206C and 206D (Acts 306 and 307). The data PIC then validates the setup request and determines whether adequate resources are available for the request (Acts 308 and 309). If adequate resources are available, the data PIC accepts the setup request and informs the slave control PIC that it has accepted the setup request (Act 310). The slave control PIC may respond to the SGSN from which the request came informing it of the successful request (Act 311). If adequate resources are not available, the data PIC informs the slave control PIC of the lack of resources (Act 312). The slave control PIC may respond to the SGSN from which the request came informing it of the lack of resources (Act 313).

Assuming a successful request, the data PIC (i.e., PIC 206C or 206D) handles packet forwarding during the communication session between the end-user 101 and corporate network 114 (Act 313). More particularly, the selected data PIC may receive data from media cards 206E and 206F, reformat header information for the data (e.g., encapsulation/decapsulation), as appropriate, and transmit the data to an output one of the media cards 206E and 206F.

Although end-users 101 have been described as communicating with a corporate network 114, in other implementations, end-users 101 may communicate with other computing devices or networks.

Figure 4:
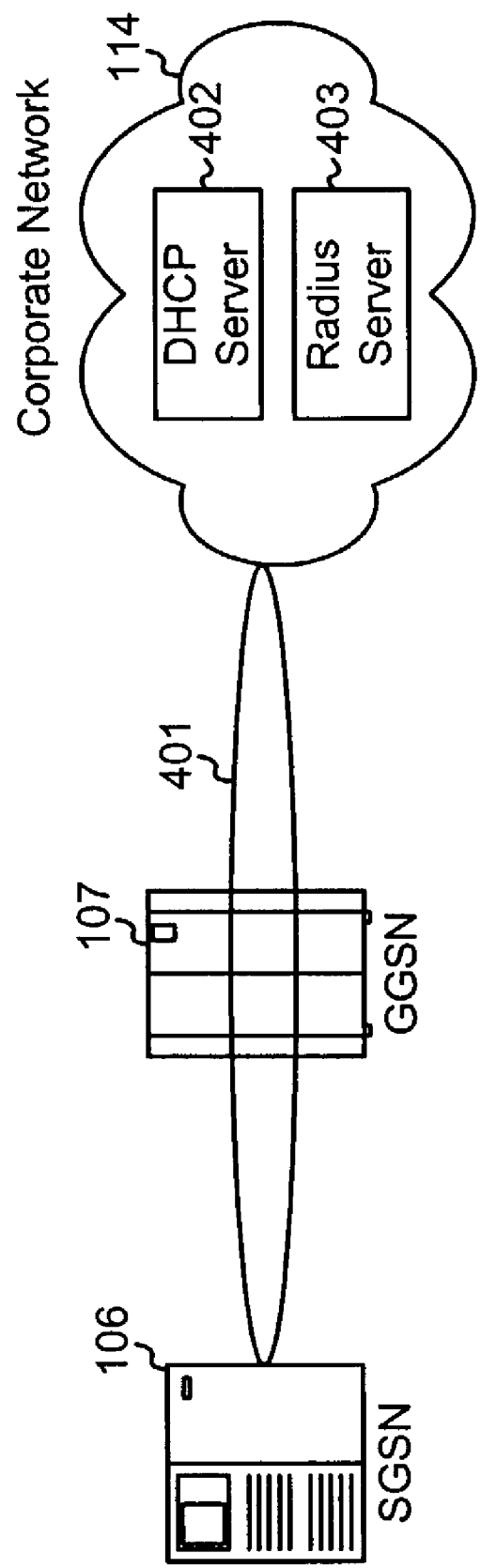
FIG. 4 is a diagram illustrating a portion of the network of FIG. 1 relating to the call setup and data transfer illustrated in FIG. 3.

FIG. 4 is a diagram illustrating a portion of network 100 relating to the call setup procedure illustrated in FIG. 3. The call session established with corporate network 114 is illustrated as GTP tunnel 401. Data PIC 206C or 206D on GGSN 107 forwards packets between SGSN 106 and corporate network 114. A DHCP server 402 and RADIUS server 403 are also shown in corporate network 114.

In GGSN 107, as described above, because the forwarding plane is implemented by data PICs that are separate from the control PICs, heavy forwarding activity will have minimal impact on call setup. If additional control or data PICs are required by GGSN 107, network administrators can simply add them to FPCs 205. Routing engine 202 may maintain a table that describes the state and the type of each of PICs 206. Accordingly, when a PIC is added or removed, routing engine 202 may update its internal table to reflect the change. Routing engine 202 may also forward the PIC change information to the control PICs.

Although a single SGSN 106 is shown in FIG. 1, in actual operation, GGSN 107 may communicate with multiple SGSNs in network 100.

CONCLUSION

A GGSN is described herein that includes components of a high-speed router that are adapted to establish communication sessions under GTP. The GGSN includes modular cards that separately implement control and data planes of GTP. The separate data and control cards provide for improved system reliability and improved flexibility in managing bandwidth.

Although the GGSN described above was primarily described as implementing the GTP protocol, other protocols could be similarly implemented.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

Moreover, while a series of acts has been presented with respect to FIG. 3, the order of the acts may be different in other implementations consistent with principles of the invention. In particular, non-dependent acts may be implemented in parallel. Additionally, lines with arrows are used in the figures to generally illustrate the flow of data. In practice, embodiments consistent with the principles of the invention may send data on these lines in both directions.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A device for implementing a packet-switched network protocol, the device comprising:
    a first type of interface card to receive a request for a communication session and perform address assignment for the communication session under the packet-switched network protocol;
    a second type of interface card, different from the first type of interface card, to receive session initiation information relating to the communication session from the first type of interface card and handle packet forwarding for the communication session;
    and
    a plurality of flexible port concentrators that include a plurality of physical slots for inserting the first and second types of interface cards,
    where the first and second type of interface cards are independently insertable into the device in any of the plurality of physical slots.

2. The device of claim 1, where the network protocol relates to completion of wireless calls.

3. The device of claim 2, where the device includes a plurality of the first type and the second type of interface cards, and where one of the first type of interface cards is designated as a master interface card that receives connection requests associated with wireless calls.

4. The device of claim 1, where the first and second type of interface cards are hot-swappable.

5. The device of claim 1, where the packet-switched network protocol is a tunnel protocol.

6. The device of claim 1, further comprising:
    a third type of interface card to physically receive and transmit data, the third type of interface card having a physical interface for inserting into the device that is compatible with an interface of the first and second type of interface cards.

7. The device of claim 1, further comprising:
    a routing engine to generate topology information for networks connected to the device.

8. A method comprising:
    receiving a request that a call be completed in a network, the request being processed by a master control card in a gateway node;
    identifying, by the master control card, an available slave control card from a plurality of slave control cards in the gateway node;
    transferring, by the master control card, the request to the identified available slave control card;
    initiating, by the identified available slave control card, a communication session with a destination device;
    transferring, by the available slave control card, session setup information to a data card in the gateway node in response to initiating the communication session; and
    forwarding data associated with the communication session via the data card, where the master control card, the plurality of slave control cards, and the data card are independently insertable into any of a plurality of slots in the gateway node.

9. The method of claim 8, where the request is received from a serving node.

10. The method of claim 8, where the control cards and the data card are hot-swappable.

11. The method of claim 8, where the control cards and the data card implement a tunnel protocol.

12. A routing device comprising:
    master control card means for receiving a request to complete a wireless call and for determining available slave control card means from a plurality of slave control card means;
    a plurality of slave control card means for initiating a communication session with a destination device and transferring session setup information in response to initiating the communication session; and
    data card means for receiving the session setup information from the plurality of slave control card means and forwarding data during the communication session, where the master control card means, the slave control card means, and the data card means are independently insertable into any of a plurality of slots in the routing device.

13. The routing device of claim 12, where the routing device includes a gateway node.

14. The routing device of claim 13, where the request is received from a serving node.

15. The routing device of claim 12, where the control card means and the data card means are each hot-swappable.

16. The routing device of claim 12, where the control card means and the data card means implement a tunnel protocol.

17. A system comprising:
   at least one serving GPRS support node (SGSN) to process wireless calls;
   a gateway GPRS support node (GGSN) coupled to the SGSN via an IP network, the GGSN including a plurality of flexible port concentrators, the flexible port concentrators including a plurality of physical slots to contain:
      at least one first interface card to receive requests for communication sessions corresponding to wireless calls received by the SGSN and perform address assignment for the communication sessions, and
      at least one second interface card, different from the at least one first interface card, to receive session initiation information relating to the communication sessions established by the first interface cards and handle packet forwarding for the communication sessions, where the first and second type of interface cards are independently insertable into any of the plurality of physical slots.

18. The system of claim 17, where the physical slots are further to contain:
   third interface cards to physically receive and transmit data.

19. The system of claim 18, where the first, second, and third interface cards are each hot-swappable.

20. The system of claim 17, where the GGSN includes a plurality of the first and second interface cards, and where one of the first interface cards is designated as a master interface card that receives connection requests associated with the wireless calls from the SGSN.

21. The system of claim 17, where the first and second interface cards implement a GPRS tunnel protocol.

22. The system of claim 17, where the GGSN further includes:
   a routing engine to generate network topology information.

23. The system of claim 22, where the GGSN further comprises:
   at least one packet forwarding engine to perform route lookup functions based on network topology information.

* * * * *